United States Patent [19]

Ando et al.

[11] Patent Number: 4,878,692

[45] Date of Patent: Nov. 7, 1989

[54] GUIDE RAIL SUPPORTING STRUCTURE

[75] Inventors: Takayuki Ando; Kazuyoshi Ishiguro; Kenji Matsui; Tatsuo Yamashita; Toshikatsu Kondo, all of Aichi, Japan

[73] Assignee: Kabushiki Kaisha Tokai-Rika-Denki-Seisakusho, Aichi, Japan

[21] Appl. No.: 224,396

[22] Filed: Jul. 26, 1988

[30] Foreign Application Priority Data

Jul. 27, 1987 [JP] Japan ............................ 62-114780[U]
Mar. 25, 1988 [JP] Japan ............................. 63-39464[U]

[51] Int. Cl.$^4$ ........................................... B60R 22/06
[52] U.S. Cl. ........................................ 280/804; 280/802; 280/808; 297/483
[58] Field of Search ............... 280/801, 802, 804, 808; 297/483

[56] References Cited

U.S. PATENT DOCUMENTS 4,623,168 11/1986 Yokote ................................ 280/804
4,691,938 9/1987 Monsigny ........................... 280/804
4,717,174 1/1988 Nishimura ........................... 280/804

FOREIGN PATENT DOCUMENTS 60-76555 5/1985 Japan .
61-185644 11/1986 Japan .
61-185645 11/1986 Japan .
62-8854 1/1987 Japan .

Primary Examiner—Richard A. Bertsch
Attorney, Agent, or Firm—Sixbey, Friedman, Leedom & Ferguson

[57] ABSTRACT

A structure for supporting a guide rail of an automatic seat belt apparatus of a vehicle on a side wall of the compartment via a holder engageable with the sides of the guide rail that are arranged in the widthwise direction of the compartment, the guide rail slidably supporting a slider and being adapted to guide the slider in the to-and-fro direction of the compartment, the slider being kept in engagement with one end of a webbing adapted to be worn by an occupant of the vehicle. The holder is engaged with the side portion of the guide rail that is outward in the widthwise direction of the compartment at an engagement portion formed in the vicinity of the end portion of the guide rail that is remote from the webbing with respect to the slider. Therefore, the holder is kept from readily being disengaged from the engagement portion even when the guide rail is, via the slider, subjected to a lateral force acting to pull the webbing inwardly of the compartment.

23 Claims, 11 Drawing Sheets

GUIDE RAIL SUPPORTING STRUCTURE

BACKGROUND OF THE INVENTION

1. Field of the Invention

The present invention relates to a structure for a guide rail used in an automatic seat belt apparatus installed in a vehicle, which supports the guide rail on the vehicle body.

2. Related Art

A known guide rail supporting structure of the above-mentioned type is illustrated in FIG. 10. In the known supporting structure, the guide rail 10 has flanges or constrictions 12 formed in the widthwise sides (i.e., on the left and right sides as viewed in FIG. 10) of the guide rail 10. A holder 14 is engaged with the flanges 12 whereby the guide rail 10 is supported on a side wall 15 of the compartment via the holder 14. The holder 14 has a mounting plate portion 14A at which the holder 14 is mounted on the compartment side wall 15, a U-shaped portion 14B formed below the mounting portion 14A and adapted to receive the guide rail 10, and pawls 14C which are formed at the tips of the U-shaped portion 14B and extend in such a manner that the guide rail 10 is held between the pawls 14C on the widthwise sides thereof. The pawls 14C engage with the constrictions 12 of the guide rail 10 so as to support the guide rail 10. The holder 14 may be a type in which it is formed by bending a single plate material, as shown in FIG. 11, or it may be a type in which it is formed by two plate materials, as shown in FIG. 12.

With the known guide rail supporting structure, however, the constrictions 12 are formed in the vicinity of the end (i.e., the lower end as shown in FIG. 10) of the guide rail 10 that is closer to a portion where an associated webbing (not shown) is in engagement with a slider 16. As a result, when, for instance, the webbing is pulled inwardly of the compartment (i.e., toward the left side as viewed in FIG. 10) and the guide rail 10 is accordingly subjected to a lateral force acting in the direction A indicated by the arrow in FIG. 10, the constrictions 12 of the guide rail 10 move a distance which is too great for them to remain in engagement with the pawls 14C, and there is a tendency for one of the pawls 14C to be disengaged at such a time as shown in FIG. 13. In order to control the distance the constrictions 12 may move, it has been necessary to increase the strength of the holder 14.

SUMMARY OF THE INVENTION

An object of the present invention is to provide a structure for supporting a guide rail which is capable of ensuring that the guide rail remains positively engaged with a holder without requiring any increase in the strength of the holder.

According to the present invention, there is provided a structure for supporting a guide rail of an automatic seat belt apparatus of a vehicle on a side wall of the compartment via a holder engageable with the sides of the guide rail that are arranged in the widthwise direction of the compartment, the guide rail slidably supporting a slider and being adapted to guide the slider in the to-and-fro direction of the compartment, the slider being kept in engagement with one end of a webbing adapted to be worn by an occupant of the vehicle, comprising a first engagement portion formed in the guide rail on the side of the guide rail that is outward in the widthwise direction of the compartment and formed in the vicinity of the end portion of the guide rail that is remote from the webbing with respect to the slider; and a first engagement piece formed in the holder and engageable with the first engagement portion.

With the above-stated arrangement of the present invention, since the first engagement piece of the holder is engaged with the first engagement portion formed in the guide rail on the side of the guide rail that is outward in the widthwise direction of the compartment and is formed in the end portion of the guide rail that is remote from the webbing with respect to the slider, even when, for instance the webbing is pulled inwardly of the compartment, and the guide rail is accordingly subjected to a lateral force via the slider, the first engagement portion of the guide rail moves only a small distance so that the first engagement portion is not readily released from its engagement with the first engagement piece of the holder.

DESCRIPTION OF THE PREFERRED EMBODIMENTS

Figure 1:
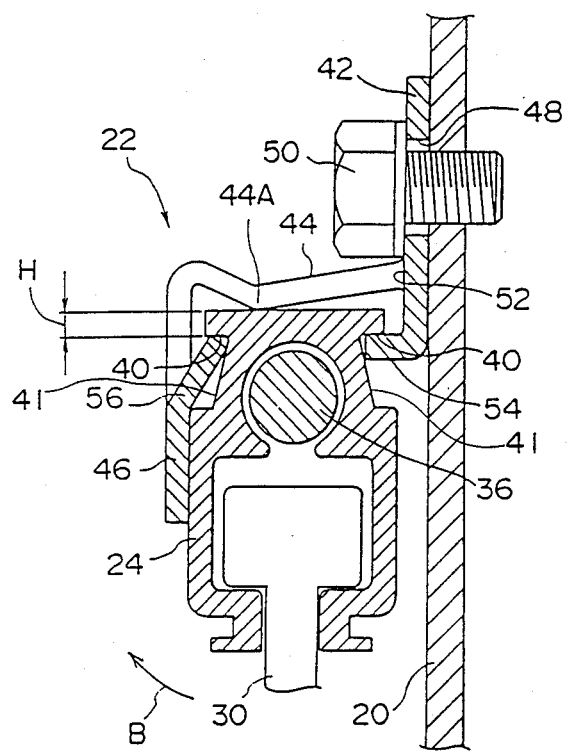
FIG. 1 is a sectional view showing a structure for supporting a guide rail in accordance with a first embodiment of the present invention.
Figure 2:
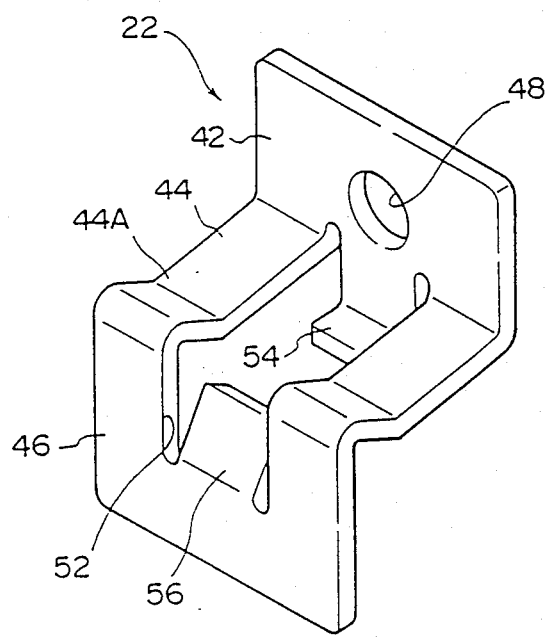
FIG. 2 is a perspective view of a holder shown in FIG. 1.
Figure 3:
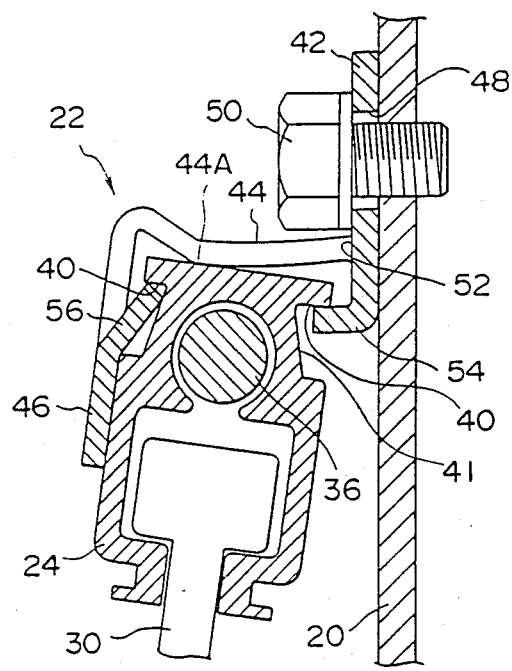
FIG. 3 is a sectional view corresponding to FIG. 1, showing the operation of the structure when a guide rail shown in FIG. 1 is subjected to a lateral force.
Figure 4:
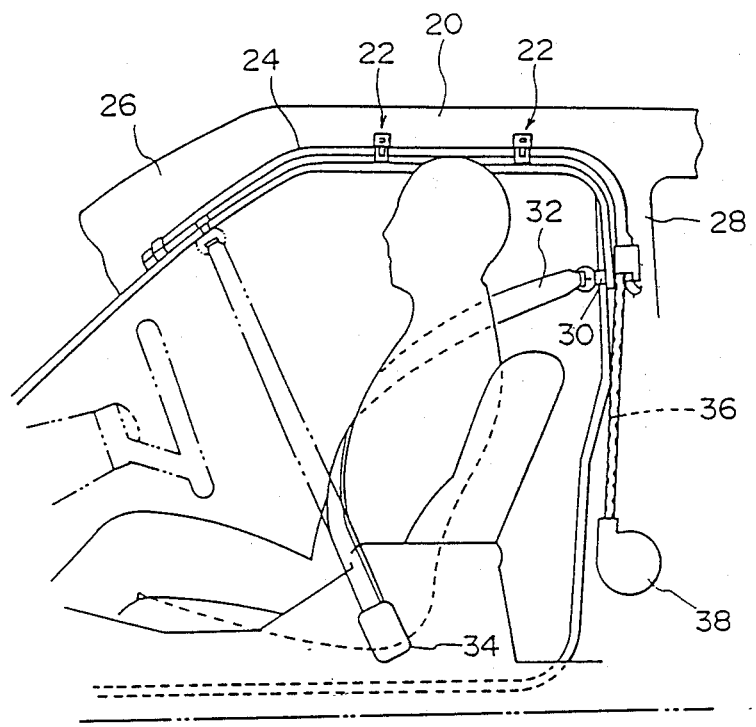
FIG. 4 is a sectional view taken from the inward of the compartment, showing the overall structure of an automatic seat belt apparatus to which the embodiment of the present invention is applied.

FIGS. 1 to 3 illustrate a structure for supporting a guide rail in accordance with a first embodiment of the present invention. FIG. 4 shows an automatic seat belt apparatus to which the embodiment of the present invention is applied.

In the automatic seat belt apparatus shown in FIG. 4, a guide rail 24 is mounted on a roof side 20 of a vehicle, which constitutes a side wall of the compartment of the vehicle, via holders 22 in such a manner as to extend in the to-and-fro direction of the compartment. The front end portion of the guide rail 24 extends along a front pillar 26, while the rear end portion of the same extends along the center pillar 28. A slider 30 is slidably fitted into the guide rail 24 so as to be guided by the guide rail 24 in the to-and-fro direction of the compartment. One end of a webbing 32 is kept in engagement with the slider 30. The other end of the webbing 32 is wound onto a retractor 34 disposed at a central portion of the vehicle. The retractor 34 accommodates therein an inertia lock mechanism adapted to suspend the unwinding of the webbing 32 instantly during the deceleration of the vehicle.

The guide rail 24 receives therein a wire 36 (also shown in FIGS. 1 and 3) in such a manner that the wire 36 tightly extends in the longitudinal direction of the guide rail 24, whereby the wire 36 is slidably guided by the guide rail 24. The front end portion of the wire 36 is engaged with the slider 30 so that the slider 30 is movable together with the wire 36. The wire 36 has its rear end portion connected to a webbing drive device 38 mounted on a lower portion of the center pillar 28, and it is driven by the drive force of the webbing drive device 38 to slide within the guide rail 24, thereby allowing the slider 30 to move forward or rearward in the compartment.

By virtue of the above-described arrangement, when the slider 30 is moved to a front end portion of the guide rail 24, an occupant is able to be seated in a seat, whereas, when the slider 30 is moved to a rear end portion of the guide rail 24 after the occupant has become seated, the webbing 32 can be worn.

The structure for supporting the guide rail 24 will be described in detail. The guide rail 24 has flanges 40 which are formed in the sides of the guide rail 24 that are arranged in the widthwise direction of the compartment and which are formed in the end portion of the guide rail 24 that is remote from the webbing 32 with respect to the slider 30, in such a manner that the girth of the guide rail 24 is increased at the flanges 40 in the widthwise direction. Each of the holders 22 engages with the flanges 40 of the guide rail 24 whereby the guide rail 24 is supported on the roof side 20 via the holders 22.

Each holder 22 has a mounting plate portion 42 adapted to be brought into contact with the roof side 20 at a position above the guide rail 24, a horizontal plate portion 44 which is joined to the lower edge of the mounting plate portion 42 at a substantially right angle and extends along the upper surface of the guide rail 24, and a vertical plate portion 46 which is joined to the horizontal plate portion 44 at a substantially right angle and extends along the side surface of the guide rail 24 that is inward in the widthwise direction of the compartment (i.e., on the left side as viewed in FIG. 1).

As best shown in FIG. 2, the mounting plate portion 42 has a circular through hole 48 formed in the substantially central portion thereof, so that a bolt 50 can be inserted through the through hole 48 to fix the holder 22 to the roof side 20 via the bolt 50.

Figure 10:
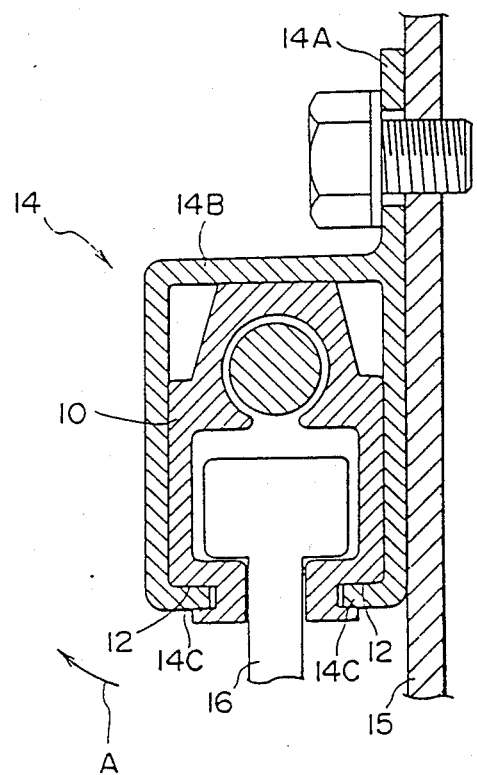
FIG. 10 is a sectional view of a conventional structure for supporting a guide rail.
Figure 11:
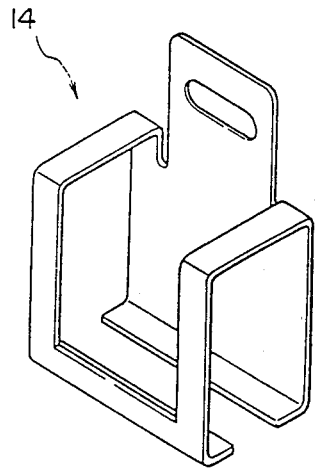
FIGS. 11 and 12 are each a perspective view of a holder which may be used in the structure shown in FIG. 10.
Figure 12:
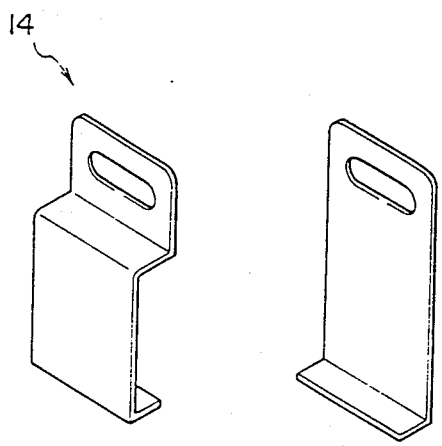
Figure 13:
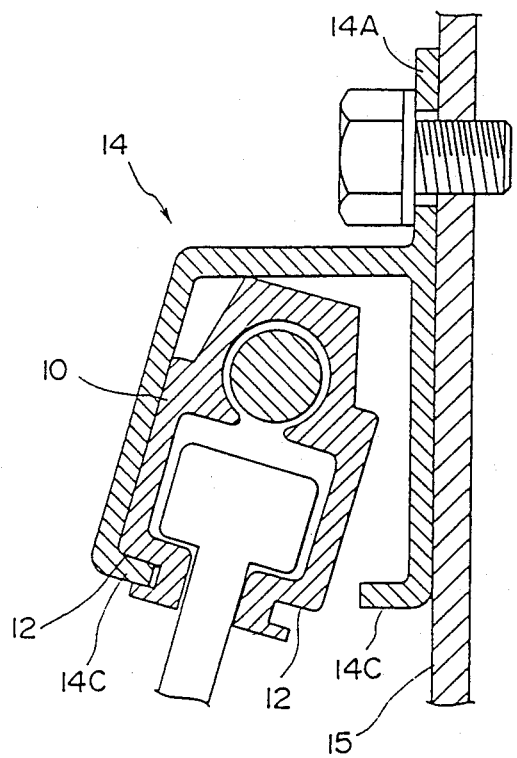
FIG. 13 is a sectional view corresponding to FIG. 10, showing the operation of the structure when a guide rail shown in FIG. 10 is subjected to a lateral force.

As best shown in FIG. 2, a rectangular through hole 52 is formed in the horizontal plate portion 44 and the vertical plate portion 46 in such a manner as to extend from the vicinity of the joint between the mounting plate portion 42 and the horizontal plate portion 44 to a vertically intermediate portion of the vertical plate portion 46. Two pawls 54 and 56 project toward the inside of the through hole 52 when viewed in the vertical direction. These pawls 54 and 56 serve as pieces at which the holder 22 engages with the guide rail 24. That is, their arrangement is such that the upper end portion of the guide rail 24 is inserted through the gap between the pawls 54 and 56, and the pawls 54 and 56 are brought into engagement with the flanges 40. The pawl 54 is substantially normally bent from a lower edge portion of the mounting plate portion 42 and extends inwardly of the compartment (i.e., toward the left side as viewed in FIG. 10). The tip of the pawl 54 is engageable with one of the flanges 40. The pawl 56 is formed by partially cutting the vertical plate portion 46 and raising the thus cut portion, and the pawl 56 rises obliquely upward from a vertical intermediate portion of the vertical plate portion 46 toward the outside of the compartment (i.e., toward the right side as shown in FIG. 1). The tip of the pawl 56 is engageable with the other flange 40. The pawl 56 is able to be deformed in such a manner as to be deflected by virtue of its resilience inwardly of the compartment (i.e., toward the left side as viewed in FIG. 1). When the upper end portion of the guide rail 24 is inserted through the gap between the pawls 54 and 56, the pawl 56 is deflected, and when the flanges 40 have passed the gap, the original shape of the pawl 56 is recovered while the pawls 54 and 56 are brought into engagement with the flanges 40.

In this embodiment, an intermediate portion of the horizontal plate portion 44 is bent to form a bent portion 44A which can be brought into contact with the upper surface of the guide rail 24. The arrangement of the bent portion 44A is such that, when the guide rail 24 is not assembled, the portion 44A is positioned at a height which is closer to the pawls 54 and 56 than a height of the portion 44A at that a height H (shown in FIG. 1) is maintained between the upper surface of the guide rail 24 and the flanges 40, whereas, when the guide rail 24 is assembled, the bent portion 44 is brought into press contact with the upper surface of the guide rail 24 by virtue of its resilience.

Next, a manner in which the guide rail 24 is mounted will be described.

First, suitable upper end portions of the guide rail 24 are each inserted through the gap between the pawls 54 and 56 of each of the holders 22, thereby assembling the holders 22 onto the guide rail 24. In this operation, each upper end portion of the guide rail 24 is inserted through the gap while the pawl 56 is deflected, and after the passage of the flanges 40 through the gap between the pawls 54 and 56, the original shape of the pawl 56 is recovered, and the pawls 54 and 56 are brought into engagement with the flanges 40. By this operation, the holders 22 are assembled onto the guide rail 24. In a state in which they are thus assembled, the bent portion 44A is in press contact with the upper surface of the guide rail 24, thereby preventing any displacement of the holders 22 relative to the guide rail 24 in the longitudinal direction thereof.

After the holders 22 have been assembled onto the guide rail 24, bolts 50 are inserted through the through holes 48 of the holders, so as to fix the mounting plate portions 42 to the roof side 20. By this operation, the guide rail 24 is mounted on the roof side 20, as shown in FIG. 1. If the position of the holders 22 relative to the guide rail 24 is determined prior to the mounting of the holders 22 on the roof side 20, this mounting operation can be facilitated since, in this case, during this mounting operation, there is no longer the need of adjusting the position of the holders 22 which are already assembled onto the guide rail 24 and the position of which is in this way prevented from displacing relative to the guide rail 24 in the longitudinal direction thereof.

With their assembled state of the above-described members, the flanges 40 of the guide rail 24 are formed in the sides of the guide rail 24 that are arranged in the widthwise direction of the compartment and are formed in the end portion (i.e., in the upper end portion) of the guide rail 24 that is remote from the webbing 32 with respect to the slider 30, and the pawls 54 and 56 of the holders 22 are engaged with the flanges 44, whereby the guide rail 24 is supported on the roof side 20 via the holders 22. By virtue of this arrangement, even when, for instance, the webbing 32 is pulled inwardly of the compartment (i.e., toward the left side as viewed in FIG. 1), and the guide rail 24 is accordingly subjected to a lateral force acting in the direction B indicated by the arrow in FIG. 1, the distance which the flanges 40 move can be small so that the flanges 40 do not readily become disengaged from the pawls 54 and 56.

Figure 5:
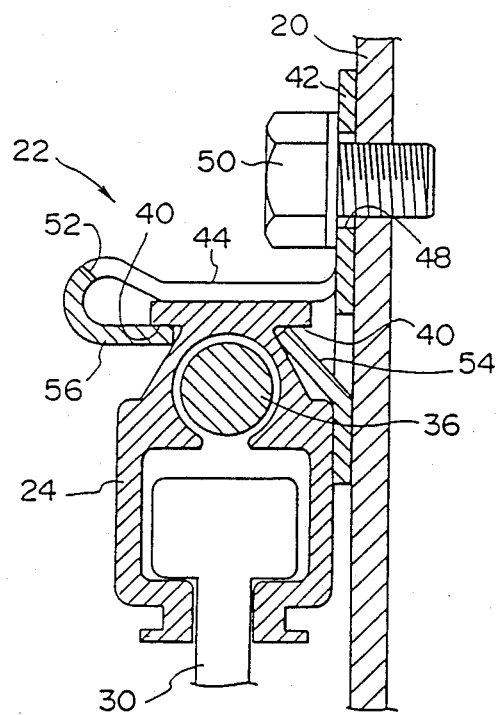
FIG. 5 is a sectional view corresponding to FIG. 1, showing a second embodiment of the present invention.
Figure 6:
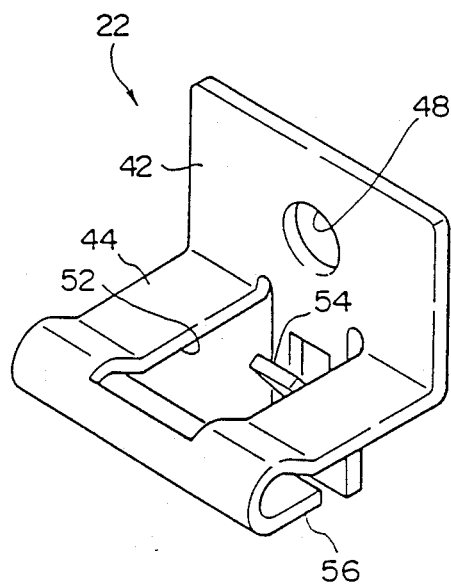
FIG. 6 is a perspective view of a holder shown in FIG. 5.

FIGS. 5 and 6 illustrate a guide rail supporting structure in accordance with a second embodiment of the present invention. In this embodiment, the pawl 56 is formed at the tip of the horizontal plate portion 44 and is bent in such a manner as to extend substantially horizontally toward the outside of the compartment (i.e., toward the right side as viewed in FIG. 5). Further in this embodiment, the pawl 54 is formed by partially cutting the mounting plate portion 42 and raising the thus cut portion, and the pawl 54 rises obliquely upward from the lower end portion of the mounting plate portion 42 inwardly of the compartment (i.e., toward the left side as viewed in FIG. 5). The upper end portion of the guide rail 24 is inserted through the gap between the pawls 54 and 56 while the pawl 54 is deflected A bent portion is formed between the pawl 56 and the horizontal plate portion 44 and is curved in such a manner that, when the pawls 54 and 56 are engaged with the flanges 40, the horizontal plate portion 44 is brought into press contact with the upper surface of the guide rail 24 by virtue of resilience of the bent portion.

Also with this embodiment, the pawls 54 and 56 are brought into engagement with the flanges 40 which are formed in the sides of the guide rail 24 that are arranged in the widthwise direction of the compartment and are formed in the end portion (upper end portion) of the guide rail 24 that are remote from the webbing 32 with respect to the slider 30. Therefore, even when, for instance, the webbing 32 is pulled inwardly of the compartment (i.e., toward the left side as viewed in FIG. 5), and the guide rail 24 is accordingly subjected to a lateral force, the flange portions 40 do not readily become disengaged from the pawls 54 and 56, thereby positively keeping the holders 22 in engagement with the guide rail 24, this advantage being the same as that provided by the first embodiment.

Figure 7:
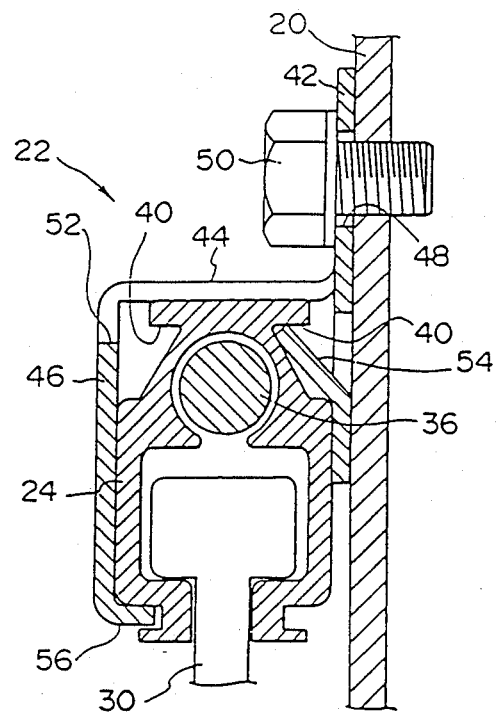
FIG. 7 is a sectional view corresponding to FIG. 1, showing a third embodiment of the present invention.

An arrangement in accordance with a third embodiment illustrated in FIG. 7 may alternatively be adopted so long as one 54 of the pawls of each holder 22 is engaged with one of the flanges 40 which is formed in the side of the guide rail 24 that is outward in the widthwise direction of the compartment and is formed in the vicinity of the end of the guide rail 24 that is remote from the webbing 32 with respect to the slider 30. As shown in FIG. 7, in the third embodiment, the other pawl 56 of each holder 22 is engaged with the side (i.e., the left side as shown in FIG. 7) of the guide rail 24 that is inward in the widthwise direction of the compartment at the end portion of the guide rail 24 where the slider 30 extends.

Figure 8:
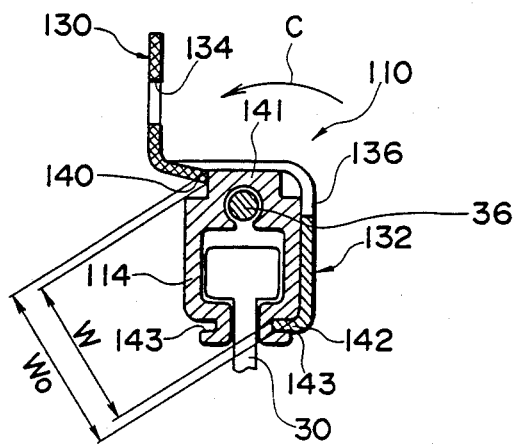
FIG. 8 is a sectional view similar to FIG. 1, showing a fourth embodiment of the present invention.
Figure 9:
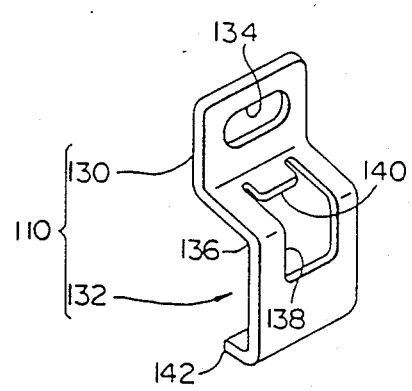
FIG. 9 is a perspective view of a holder shown in FIG. 8.

FIGS. 8 and 9 illustrate a guide rail supporting structure in accordance with a fourth embodiment of the present invention.

Also in this embodiment, similar to the case of the first embodiment illustrated in FIG. 4, a guide rail 114 is mounted on a roof side 20 of a vehicle via holders 110. The front end portion of the guide rail 114 extends along a front pillar 26, while the rear end portion of the guide rail 114 is bent substantially normally to extend along a center pillar 28. A slider 30 is slidably disposed within the guide rail 114, and one end of a webbing 32 is kept in engagement with the slider 30. The other end of the webbing 32 is wound onto a retractor 34 in a layered manner by a predetermined force, the retractor being disposed at a central position of the vehicle. The retractor 34 accommodates therein an inertia lock mechanism adapted to instantly suspend the unwinding of the webbing 32 when the vehicle experiences an emergency.

The guide rail 114 receives therein a wire 36 in such a manner that the wire 36 tightly extends in the longitudinal direction of the guide rail 114, whereby the wire 36 is slidably guided by the guide rail 114. The front end portion of the wire 36 is engaged with the slider 30 so that the slider 30 is movable together with the wire 36. The other end portion of the wire 36 is connected to a webbing drive device 38 mounted on a lower portion of the center pillar 28, and the wire 36 is driven by the drive force of the webbing drive device 38 to slide within the guide rail 14, thereby allowing the slider 30 to move forward or rearward of the vehicle.

By virtue of the above-described arrangement, when the slider 30 is moved to a forward end portion of the guide rail 114, a space is provided between the webbing 32 and a seat, thereby facilitating an occupant to become seated in the seat. After the occupant has become seated, when the slider 30 is moved to a rear end portion of the guide rail 114 by the operation of the webbing drive device 38, the webbing 32 can be worn.

The structure for supporting the guide rail 114, in particular the holders 110, will be described in detail.

Each of the holders 110 is manufactured by forming and bending a resilient thin plate material. Each holder 110 comprises a mounting portion 130 at which the holder 110 is mounted on the vehicle body, and a supporting portion 132 for supporting the guide rail 114. A mounting hole 134 is formed at the center of the mounting portion 130 so that a bolt, not shown, can be inserted through the hole 134. The supporting portion 132 is formed continuously from and integrally with the lower edge of the mounting portion 130. The intermediate portion of the supporting portion 132 is bent into a substantial L-shape to form a bent portion 136, and the portion 132 is able to be deformed by virtue of its resilience in the vicinity of the L-shaped bent portion 136. At the center of the bent portion 136, a rectangular through hole 138 is formed. A pawl 140, serving as an engagement pawl, projects from the upper end portion of the through hole 138 (i.e., from the bent joint between the mounting portion 130 and the supporting portion 132) in such a manner as to slightly decline. The pawl 140 is engageable with the side of an engagement projection 141 formed on the upper end portion of the guide rail 114 that is outward of the vehicle (i.e., on the left side as viewed in FIG. 8).

On the other hand, a pawl 142 is formed at the lower edge of the bent portion 136 in such a manner as to be bent substantially normally and extend inwardly (i.e., to the left side as viewed in FIG. 8). The pawl 142 serves as an engagement pawl, and it is adapted to be fitted into an engagement groove 143 formed in the lower end portion of the guide rail 114. The arrangement of the pawls 140 and 142 is such that the dimension W between these pawls is set at a value slightly smaller than a corresponding dimension Wo of the guide rail 114 to be received in the gap between these pawls 140 and 142, that is, in the space defined by the bent portion 136.

The guide rail 114 is mounted using the supporting structure in accordance with this embodiment in the following manner.

To fix the guide rail 114 to the center pillar 28, the holders 110 are first assembled onto the guide rail 114. In this operation, the pawl 142 of each holder 110 is fitted into the engagement groove 143 of the guide rail 114. Subsequently, the holder 110 is rotated about the vicinity of the fitted pawl 142 in the direction C indicated by the arrow in FIG. 8 while the bent portion 136 is slightly deformed by virtue of its resilience, thereby bringing the pawl 140 into engagement with the mating side surface of the engagement projection 141 of the guide rail 140. By virtue of the arrangement in which the dimension W between the pawls 140 and 142 is set at a value slightly smaller than the corresponding dimension Wo of the guide rail 114 to be received in the gap between the pawls 140 and 142, i.e., in the space defined by the bent portion 136, as well as the arrangement in which the bent portion 136 has resilience, the supporting portion 132 (i.e., the holder 110) is positively mounted on the guide rail 114. In these arrangements, it is preferred that the dimensions are determined in such a manner that, when the pawl 140 is brought into engagement with the engagement projection 141, as shown in FIG. 8, the bent portion 136 is brought into contact with the upper surface of the engagement projection 141 or the side surface of the guide rail 114.

After the holders 110 have been mounted on the guide rail 114, bolts are inserted through the mounting holes 134 of the mounting portions 130, thereby fixing the holders 110 to the vehicle body together with the guide rail 114.

Also with this embodiment, similarly to the case of the third embodiment, the pawl 140 of each holder 110 is engaged with the engagement projection 141 which is formed in the side of the guide rail 114 that is outward in the widthwise direction of the compartment and is formed in the vicinity of the end portion of the guide rail that is remote from the webbing 32 with respect to the slider 30, thereby supporting the guide rail 114. Therefore, even when the guide rail 141 is subjected to a lateral force, the pawl 140 does not readily become disengaged from the engagement projection 141.

Further, each of the holders 110 can be mounted on the guide rail 114 with a very simple operation in which the pawl 142 is fitted into the engagement groove 143 of the guide rail 114, and the pawl 140 is brought into engagement with the engagement projection 141 while the bent portion 136 is deformed by virtue of its resilience. Still further, since each holder 110 can be simply manufactured as an integral component part by simple forming and bending, a reduction in production costs can be achieved.

What is claimed is:

1. A structure for supporting a guide rail of an automatic seat belt apparatus of a vehicle on a side wall of a compartment to slidably support and move a slider attached to a webbing in a longitudinal direction of said vehicle front and rearwards along said wall of said compartment for positioning said webbing about an occupant in said vehicle, said structure comprising:

a holder being engageable with sides of said guide rail and being disposed on said side wall in the widthwise direction of the compartment, said holder having at least one first engagement piece for supporting said guide rail; and a first engagement portion formed at an outside portion of said guide rail in the widthwise direction of the compartment and formed essentially in the end portion of said guide rail that is remote from said webbing with respect to said slider, said first engagement portion being engageable with said first engagement piece.

2. A structure for supporting a guide rail according to claim 1, wherein said first engagement portion comprises a recess formed in said guide rail.

3. A structure for supporting a guide rail according to claim 2, wherein said first engagement piece is formed by partially cutting said holder and raising the thus cut portion.

4. A structure for supporting a guide rail according to claim 2, wherein said recess is one of constrictions formed in said sides of said guide rail that are arranged in the widthwise direction of the compartment.

5. A structure for supporting a guide rail according to claim 1, further comprising a second engagement portion formed in said guide rail on the side of said guide rail that is inward in the widthwise direction of the compartment, and a second engagement piece formed in said holder and engageable with said second engagement portion.

6. A structure for supporting a guide rail according to claim 5, wherein said second engagement portion comprises a recess.

7. A structure for supporting a guide rail according to claim 5, wherein said first and second engagement portions comprise constrictions formed in said sides of said guide rail that are arranged in the widthwise direction of the compartment.

8. A structure for supporting a guide rail according to claim 5, wherein said first and second engagement pieces are each formed by partially cutting said holder and raising the thus cut portion.

9. A structure for supporting a guide rail according to claim 1, wherein said first engagement portion comprises a stepped portion formed in said guide rail and having a diameter smaller than the dimension of said guide rail in the widthwise direction of the compartment.

10. A structure for supporting a guide rail according to claim 1, wherein said first engagement portion comprises a flange formed in said guide rail in such a manner as to form a portion of said guide rail which has an increased dimension in the widthwise direction of the compartment.

11. A structure for supporting a guide rail of an automatic seat belt apparatus of a vehicle on a side wall of a compartment, said guide rail receiving one end of a slider to slidably support said slider and being adapted to guide said slider along said side wall of the compartment, the other end of said slider being defined as an engagement end at which said slider is kept in engagement with one end of a webbing adapted to be worn by an occupant of said vehicle, comprising:

a holder having engagement pieces engageable with the sides of said guide rail that are arranged in the widthwise direction of the compartment, and a mounting portion adapted to be mounted on said side wall; and a first engagement portion formed in an outer side of said guide rail in the widthwise direction of the compartment and formed in the vicinity of the end portion of said guide rail that is remote from said webbing with respect to said slider, said first engagement portion being engageable with one of said engagement pieces.

12. A structure for supporting a guide rail according to claim 11, wherein said first engagement portion comprises a recess formed in the outward side of said guide rail.

13. A structure for supporting a guide rail according to claim 12, wherein said one of said engagement pieces comprises a projection adapted to be inserted into said recess.

14. A structure for supporting a guide rail according to claim 11, wherein said first engagement portion is one of constrictions formed in said sides of said guide rail that are arranged in the widthwise direction of the compartment.

15. A structure for supporting a guide rail according to claim 11, wherein said engagement pieces comprise a pair of projections which extend toward each other.

16. A structure for supporting a guide rail according to claim 11, wherein said first engagement portion comprises a flange formed in said guide rail in such a manner as to form a portion of said guide rail which has an increased dimension in the widthwise direction of the compartment.

17. A structure for supporting a guide rail according to claim 11, further comprising a second engagement portion formed in said guide rail on the side of said guide rail that is inward in the widthwise direction of the compartment, said second engagement portion being engageable with the other of said engagement pieces.

18. A structure for supporting a guide rail according to claim 17, wherein said second engagement portion comprises a recess formed in said guide rail on the side of said guide rail that is inward in the widthwise direction of the vehicle interior.

19. A structure for supporting a guide rail according to claim 18, wherein said first and second engagement portions are formed substantially symmetrically.

20. A structure for supporting a guide rail according to claim 11, wherein said first engagement portion comprises a small-diameter portion formed in said guide rail and having a diameter smaller than the dimension of said guide rail in the widthwise direction of the compartment.

21. A guide rail supporting structure for supporting a guide rail of an automatic seat belt apparatus adjacent a side wall of the compartment of a vehicle, said guide rail being adapted to support a slider attached at one end thereof to a webbing and for guiding said slider in essentially a longitudinal direction of said vehicle, comprising;

holding means mounted on said side wall and engageable with said guide rail for holding said guide rail;

at least one engagement piece extending from said holding means; and an engagement means formed in an upper portion of said guide rail adjacent said side wall;

wherein said engagement piece engages said engagement means to limit the movement of said guide rail in a direction transverse to said longitudinal direction.

22. A guide rail supporting structure according to claim 21, wherein said engagement piece comprises a partially cut portion of said holder which is bent out of a plane formed by said holder.

23. A guide rail supporting structure according to claim 21, wherein said guide rail includes a second engagement means formed on the side of said guide rail away from said side wall, and said holder includes a second engagement piece for engaging said second engagement means.

* * * * *